(12) United States Patent
Wu et al.

(10) Patent No.: US 6,618,540 B2
(45) Date of Patent: Sep. 9, 2003

(54) OPTICAL FIBER HOLDING DEVICE

(75) Inventors: Kun-Tsan Wu, Tu-Chen (TW); Chien-Cheng Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/035,851

(22) Filed: Dec. 24, 2001

(65) Prior Publication Data

US 2003/0072552 A1 Apr. 17, 2003

(30) Foreign Application Priority Data

Oct. 17, 2001 (CN) .......................................... 90217727

(51) Int. Cl.[7] .............................. G02B 6/00; H01B 7/00; H01B 7/24
(52) U.S. Cl. ........................ 385/137; 174/5 R; 174/135
(58) Field of Search ................................. 385/136, 137; 174/135, 136, 5 R

(56) References Cited

U.S. PATENT DOCUMENTS

| 817,557 | A | * | 4/1906 | Hatherly ................... 24/129 A |
|---|---|---|---|---|
| 2,770,667 | A | * | 11/1956 | Runde ......................... 174/5 R |
| 2,871,282 | A | * | 1/1959 | Tipsord et al. ............... 174/5 R |
| 3,835,238 | A | * | 9/1974 | West ........................... 174/5 R |
| 3,909,047 | A | * | 9/1975 | Salmela ....................... 285/119 |
| 4,628,145 | A | * | 12/1986 | Kolcio et al. ................ 174/5 R |
| 5,661,841 | A | * | 8/1997 | Van Noten ................... 385/135 |

* cited by examiner

Primary Examiner—Michael C. Zarroli
(74) Attorney, Agent, or Firm—Wei Te Chung

(57) ABSTRACT

An optical fiber holding device (100) comprises a fastening flange (120) and a coil-shaped fiber receiving portion (110) connecting with the flange. The receiving portion is formed by a wall (113) spiraling from an inner end (114) thereof outwardly. A central holding space (112), a spiral guiding passage (111), and an inlet (115) of the passage are thereby defined. The flange is connected with an outer end of the wall adjacent the inlet. A pair of through holes (121) is defined in the flange. The holding device is integrally formed by molding plastic material, or by bending a metal sheet. Each optical fiber (130) is inserted into the inlet, guided along the passage, and received in the central holding space. Screw s are extended through the through holes to secure the holding device together with the optical fibers to an optical module.

11 Claims, 8 Drawing Sheets

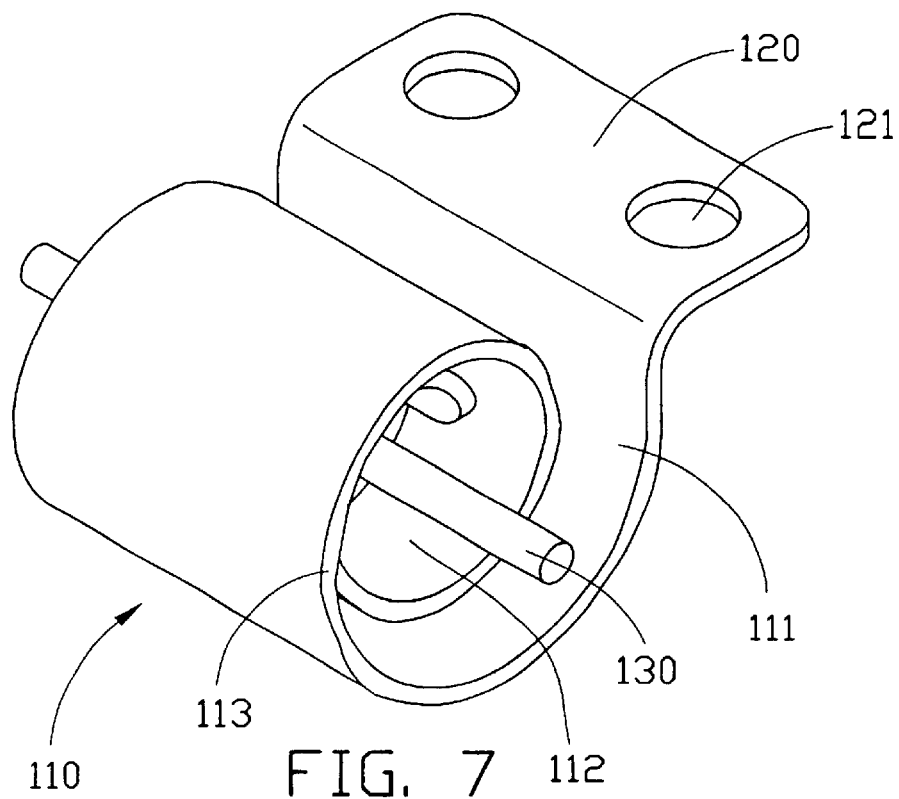
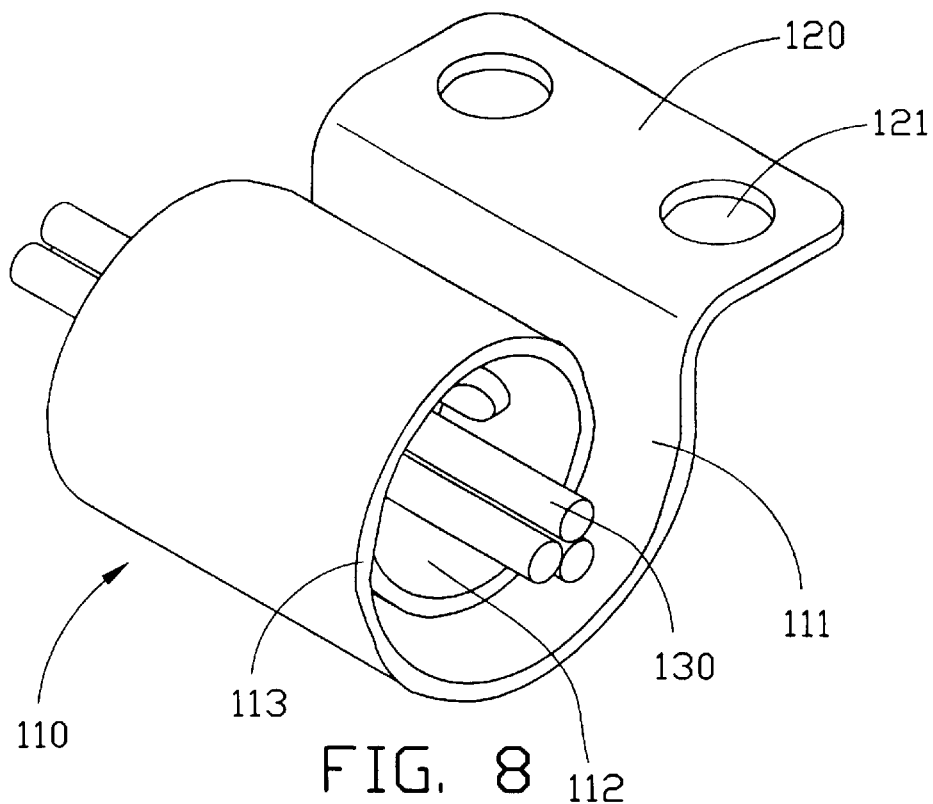

OPTICAL FIBER HOLDING DEVICE

BACKGROUND OF THE INVENTION

1. Field of the Invention

The present invention relates to securing of optical fibers, and particularly to one-piece optical fiber holding devices used to bind, hold and fix optical fibers.

2. Description of the Prior Art

Optical fibers have many advantages over other communications means. For example, optical fibers have wide bandwidth and low loss, and are immune from electromagnetic interference. These advantages are making optical fibers more popular in virtually all areas of communications. Optical modules in an optical communications system can include dense wavelength division multiplexers (DWDMs), optical add-drop mutiplexers (OADMs), erbium doped fiber amplifiers (EDFAs), and a variety of optical couplers. Such modules are interconnected with optical fibers. However, being made of quartz glass or similar material, optical fibers are fragile and easily broken. This is particularly so for optical fibers which have relatively small diameters. Optical fiber holding devices are used in modules to retain and protect optical fibers therein.

A conventional optical fiber holding device 10 as disclosed in Taiwan Pat. No. 311696 is illustrated in FIG. 1. The holding device 10 comprises a base 11, a sliding block 13, and a screw 14. The base 11 has a guide 12 formed on a top surface thereof. A nut (not shown) is fixedly received in the base 11. The guide 12 has an elongated slot (not shown) in a middle thereof. The sliding block 13 is slideably fitted on the guide 12. Two parallel grooves 131 are defined in a top face of the sliding block 13, on opposite sides of a vertical hole (not labeled) defined in the top face. The screw 14 extends through the vertical hole and the slot to engage with the nut in the base 11. Optical fibers 15 are put in the grooves 131, and are secured therein by a head of the screw 14 pressing on the optical fibers 15.

The holding device 10 holds and protects the optical fibers 15. However, if the pressing force of the screw 14 is too large, the optical fibers 15 may be damaged. If the pressing force is too little, the optical fibers 15 may escape from the grooves 131.

In addition, the holding device 10 has many components, making it unduly costly and troublesome to manufacture and assemble. Furthermore, the number of the optical fibers 15 that can be secured is limited to the number of grooves 131 in the sliding block 13.

Accordingly, an improved optical fiber holding device which overcomes the abovementioned shortcomings is desired.

SUMMARY OF THE INVENTION

Therefore an object of the present invention is to provide an improved optical fiber holding device which safely and securely binds, holds and fixes optical fibers in an optical module.

Another object of the present invention is to provide a one-piece optical fiber holding device which is inexpensive and easy to manufacture.

A further object of the present invention is to provide an optical fiber holding device which allows quick and easy securing of a variety of numbers and sizes of optical fibers.

To achieve the objects set out above, an optical fiber holding device in accordance with a preferred embodiment of the present invention comprises a fastening flange and a coil-shaped fiber receiving portion connecting with the flange. The receiving portion is formed by a wall spiraling from an inner end thereof outwardly. A central holding space, a spiral guiding passage, and an inlet of the passage are thereby defined. The flange is connected with an outer end of the wall adjacent the inlet. A pair of through holes is defined in the flange. The holding device is integrally formed by molding plastic material, or by bending a metal sheet. Each optical fiber is inserted into the inlet, guided along the passage, and received in the central holding space. Screws are extended through the through holes to secure the holding device together with the optical fibers to an optical module.

Other objects, advantages and novel features of the present invention will become more apparent from the following detailed description when taken in the conjunction of the accompanying drawings.

BRIEF DESCRIPTION OF THE DRAWINGS

FIGS. 5, 6 and 7 are similar to FIG. 3, but sequentially showing an optical fiber being received in the holding device;

FIG. 8 is similar to FIG. 3, but showing a plurality of optical fibers received in the holding device;

DETAILED DESCRIPTION OF THE INVENTION

Figure 1:
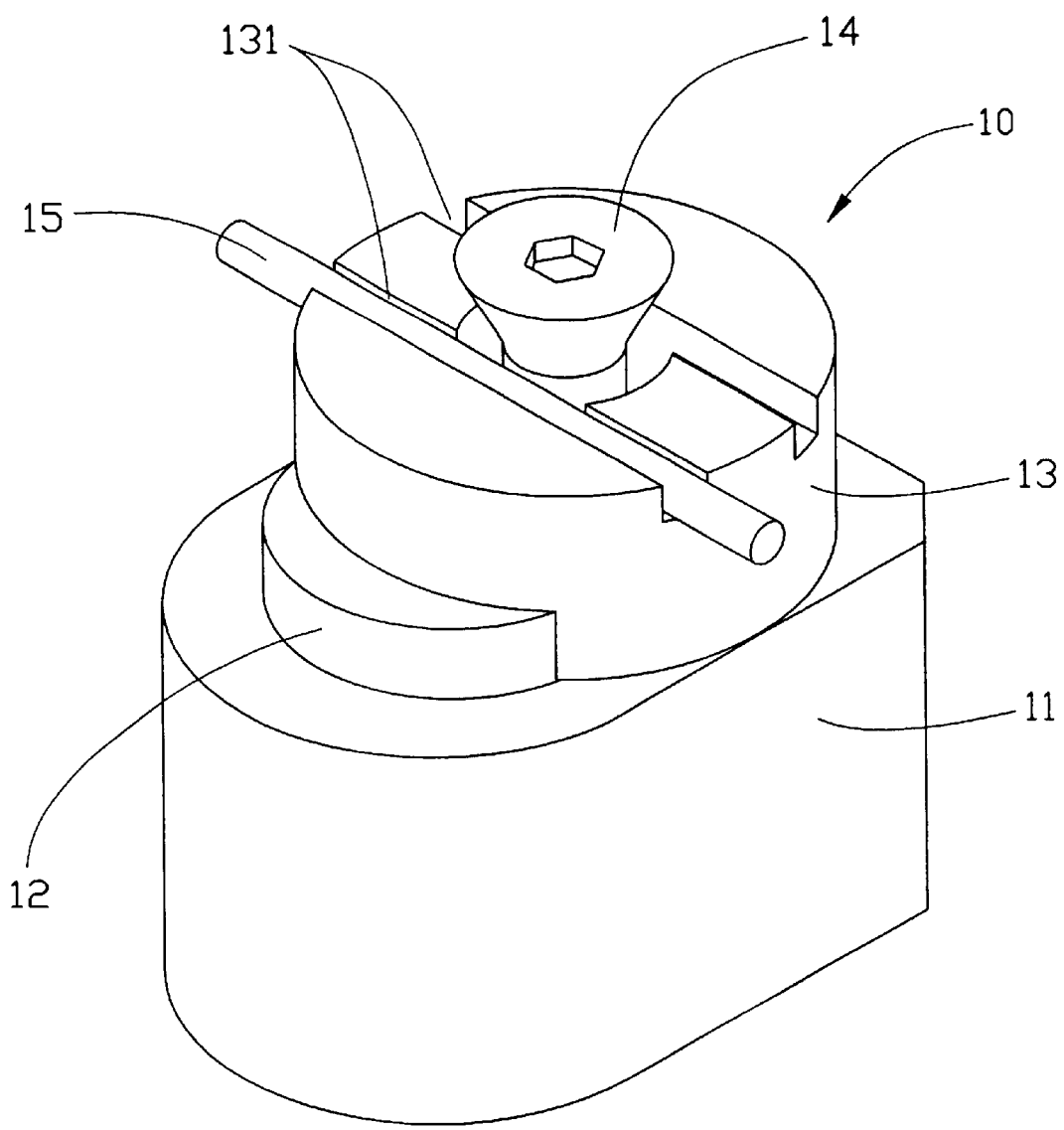
FIG. 1 is a perspective view of a conventional optical fiber holding device, together with an optical fiber held therein.

Reference will now be made to the drawing figures to describe the present invention in detail.

Figure 2:
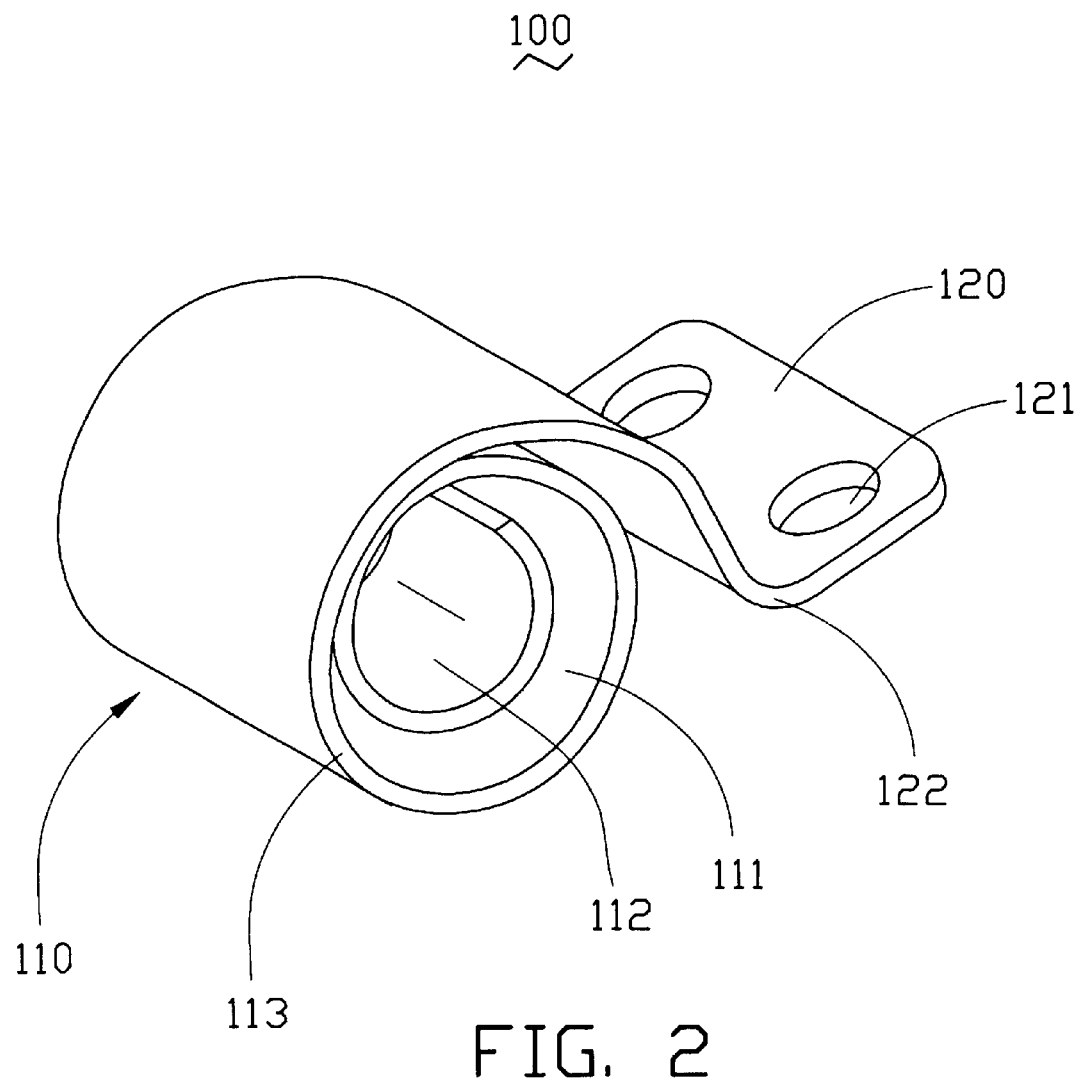
FIG. 2 is a perspective view of an optical fiber holding device in accordance with a preferred embodiment of the present invention.
Figure 3:
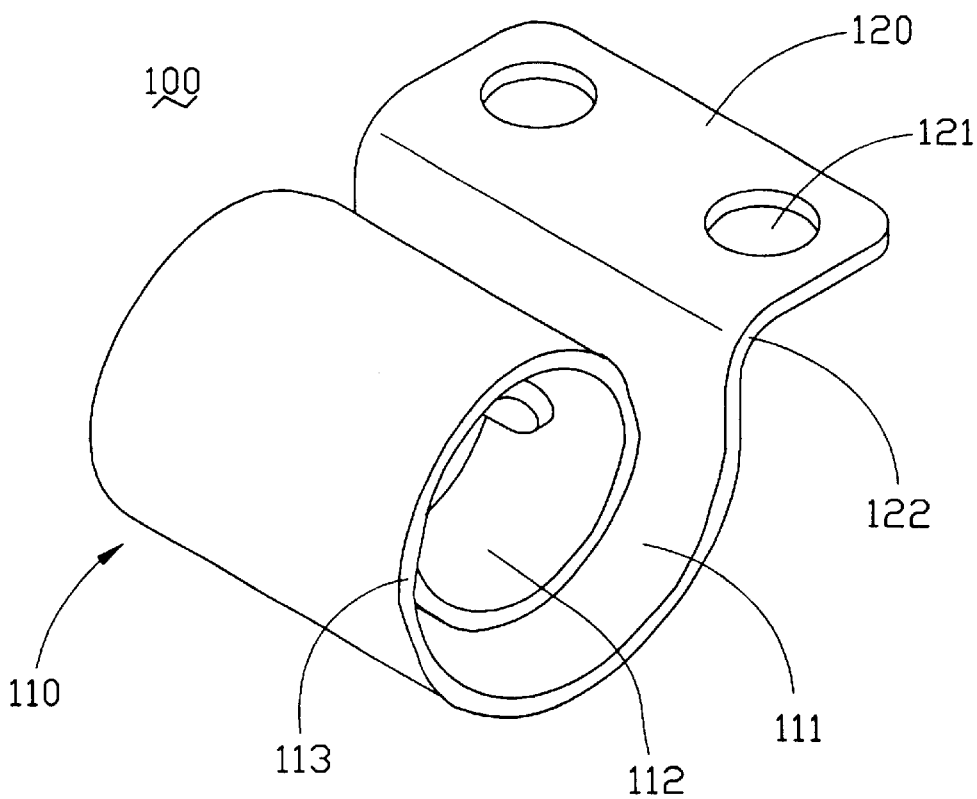
FIG. 3 is similar to FIG. 2, but viewed from another aspect.
Figure 4:
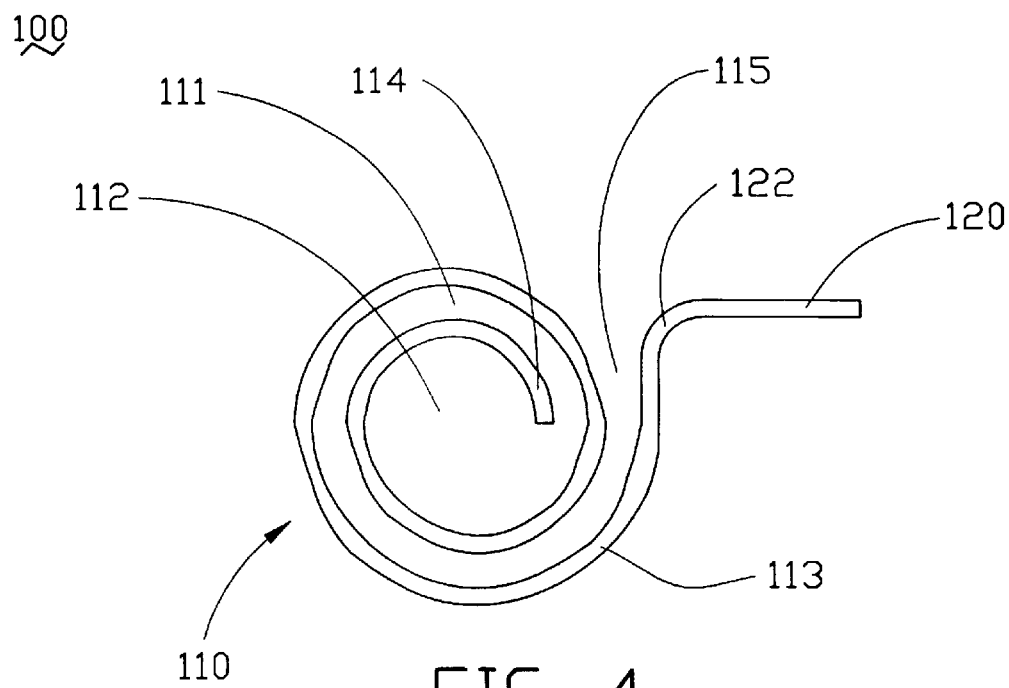
FIG. 4 is a side elevational view of FIG. 3.

Referring to FIGS. 2, 3 and 4, an optical fiber holding device 100 in accordance with a preferred embodiment of the present invention comprises a fastening flange 120 and a coil-shaped fiber receiving portion 110 connecting with the flange 120. The holding device 100 is integrally formed by molding plastic material, or by bending a metal sheet.

The receiving portion 110 includes a wall 113 spiraling from an inner end 114 thereof outwardly for about two circuits to connect with an inner end 122 of the flange 120. A spiral guiding passage 111 is thereby defined in the receiving portion 110. An inlet 115 of the passage 111 is defined between the inner end 122 and the wall 113. A central holding space 112 is defined in a middle of the receiving portion 110, in communication with the passage 111. A width of the passage 111 is greater than a diameter of each optical fiber 130 (see FIGS. 5–8) to be held by the holding device 100, so that each optical fiber 130 can move through the passage 111. A diameter of the central holding space 112 is much greater than the width of the passage 111, so that a number of optical fibers 130 can be received in the holding space 112.

The flange 120 is rectangular, and defines two fixing holes 121 therein. The fixing holes 121 are for extension of screws (not shown) therethrough to threadedly engage with an optical module (not shown) incorporating the optical fibers 130. The holding device 100 together with the optical fibers 130 is thereby secured to the optical module.

Figure 5:
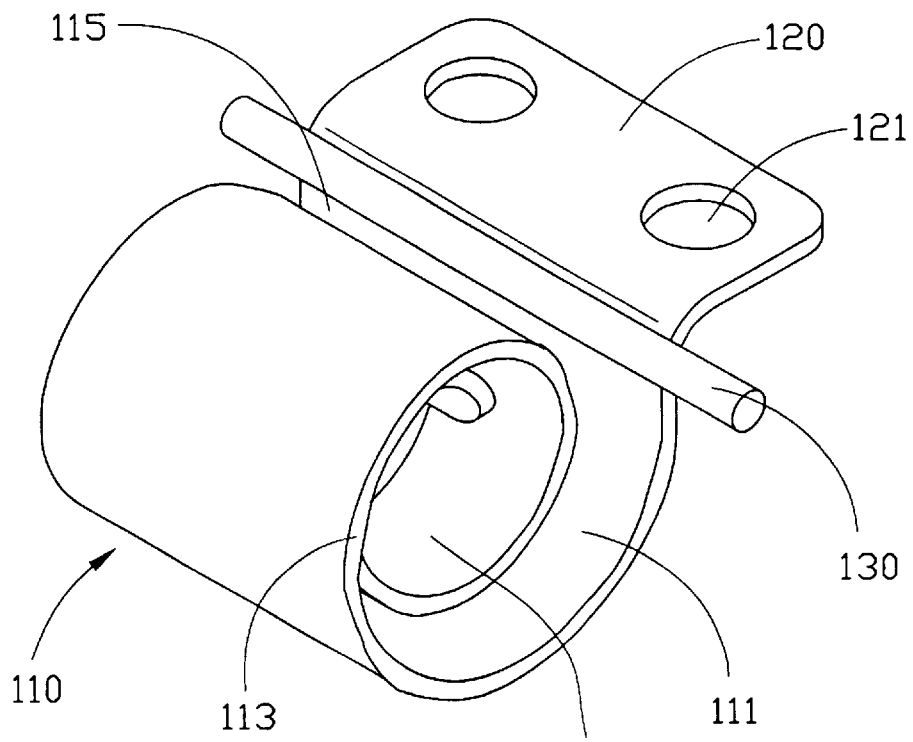
Figure 6:
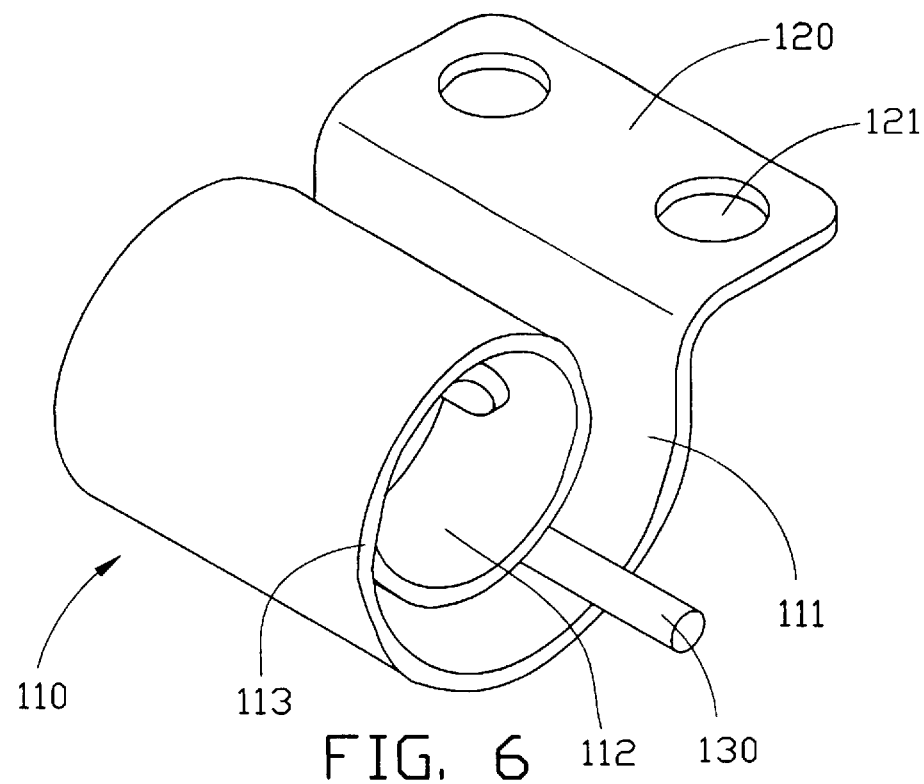

FIGS. 5, 6 and 7 sequentially show how each optical fiber 130 is received in the holding device 100. The optical fiber 30 is relatively long, and only a section thereof is shown in FIGS. 5, 6 and 7. Firstly, the optical fiber 130 is placed in the inlet 115 of the passage 111. Then, it is moved along the passage 111 until it is received in the holding space 112. Referring to FIG. 8, additional optical fibers 130 can then be received in the holding space 112 by repeating the above-described procedure.

Figure 9:
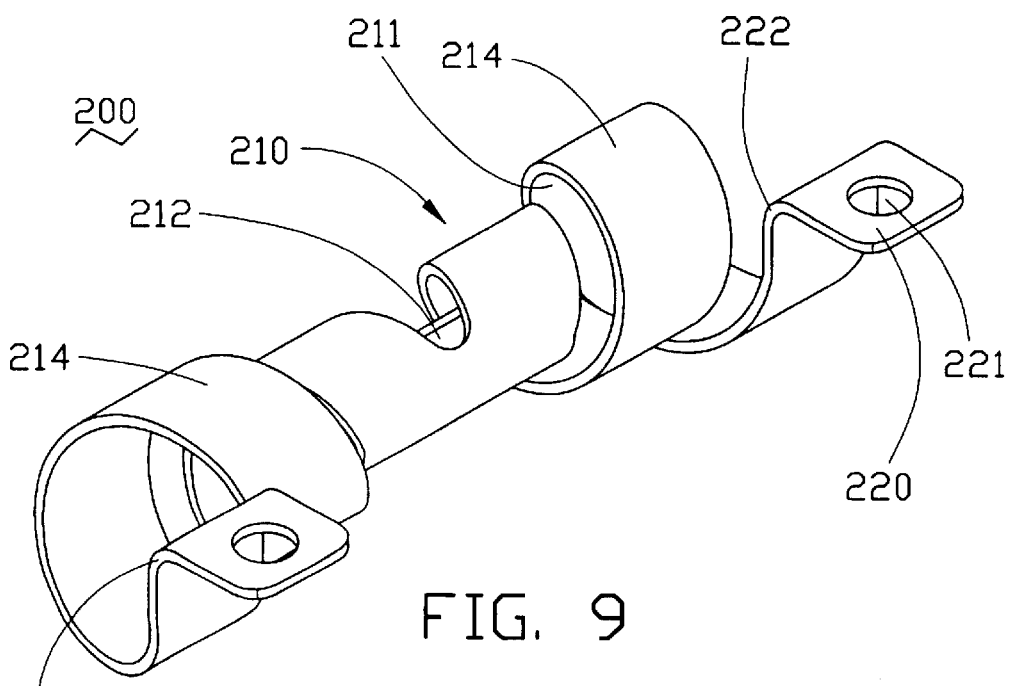
FIG. 9 is a perspective view of an optical fiber holding device in accordance with an alternative embodiment of the present invention.
Figure 10:
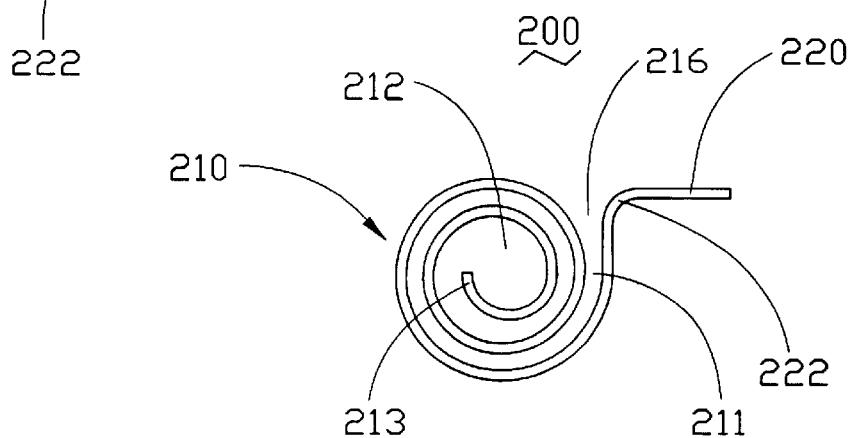
FIG. 10 is a side elevational view of FIG. 9.
Figure 11:
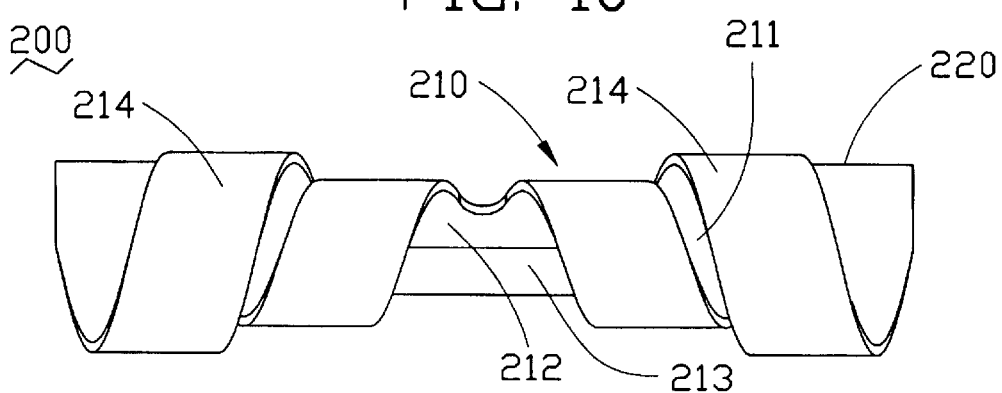
FIG. 11 is a rear elevational view of FIG. 9.

FIGS. 9, 10 and 11 show an optical fiber holding device 200 in accordance with an alternative embodiment of the present invention. The holding device 200 comprises a coil-shaped optical fiber receiving portion 210, and two fastening flanges 220 connecting with opposite ends of the receiving portion 210 respectively. The holding device 200 is integrally formed by molding plastic material, or by bending a metal sheet.

The receiving portion 210 comprises two wings 214 that respectively spiral in opposite directions from a common inner end 213 thereof to respective inner ends 222 of the flanges 220. The wings 214 spiral outwardly from the common inner end 213 to cooperatively define a spiral guiding passage 211 in the receiving portion 210. An inlet 216 is cooperatively defined between the inner ends 222 of the flanges 220 and the wings 214. A central holding space 212 is defined at a central longitudinal axis of the receiving portion 210, in communication with the guiding passage 211.

Figure 12:
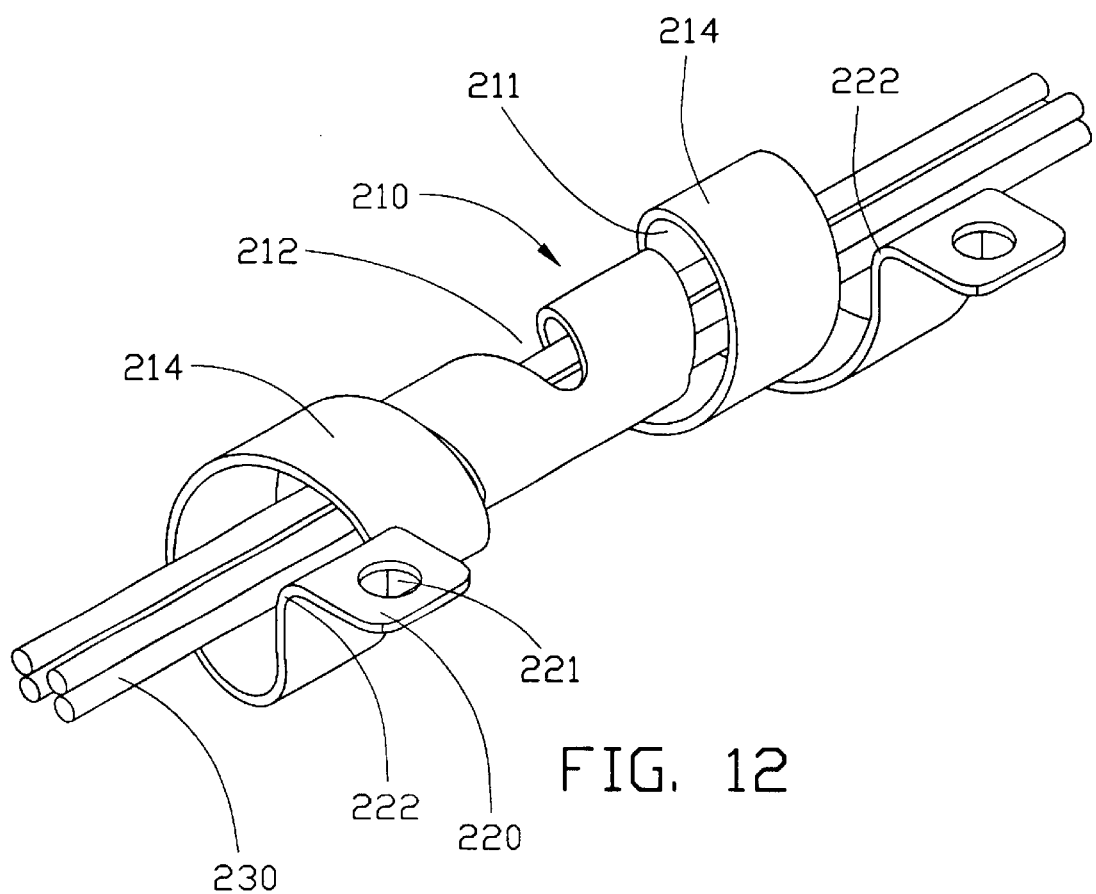
FIG. 12 is similar to FIG. 9, but showing a plurality of optical fibers received in the holding device.
Figure 13:
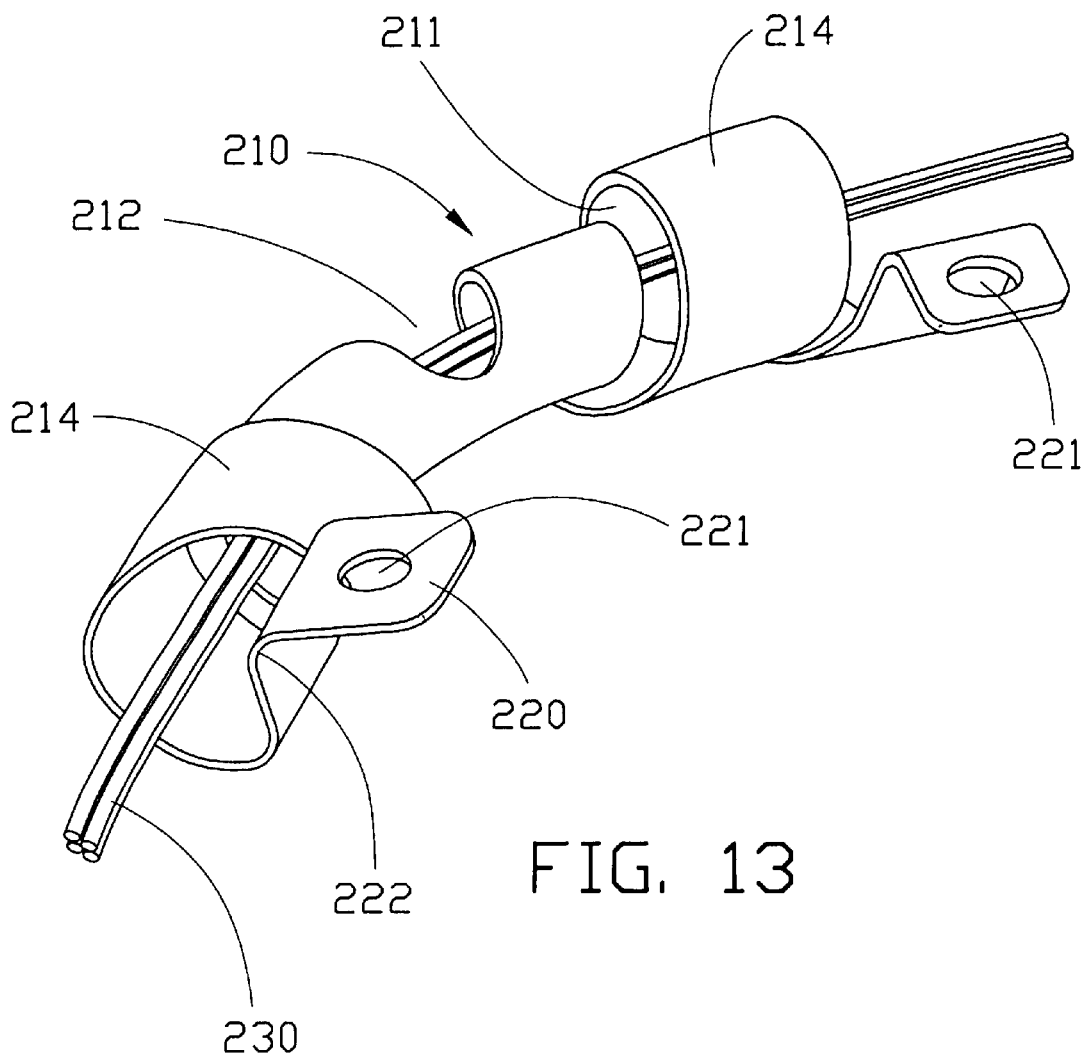
FIG. 13 is similar to FIG. 12, but showing the holding device with the optical fibers bent.

Referring to FIG. 12, each flange 220 is rectangular, and defines a through hole 221 therein. The through hole 221 is for extension of a screw (not shown) therethrough to threadedly engage with an optical module (not shown) incorporating optical fibers 230. The holding device 200 together with the optical fibers 230 is thereby secured to the optical module. Steps for accommodating the optical fibers 230 in the holding space 212 of the holding device 200 are similar to the corresponding steps of the preferred embodiment. The holding device 200 is flexible relative to the central longitudinal axis of the receiving portion 210. Referring to FIG. 13, the holding device 200 can be bent in a variety of ways according to the requirements of particular mounting applications.

In the present invention, it is almost impossible for the optical fibers 130, 230 to escape from the holding space 112, 212 of the holding device 100, 200. In addition, the holding space 112, 212 can receive a varying number of optical fibers 130, 230. Furthermore, a diameter of the holding space 112, 212 can be determined according to the number and size of the optical fibers 130, 230 to be held by the holding device 100, 200 in any particular application. Moreover, the holding device 100, 200 is a one-piece device which is easy and inexpensive to manufacture.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber holding device holding at least one optical fiber therein and adapted for securing the at least one optical fiber to at least one stationary object, the holding device comprising:

a receiving portion formed by a wall spiraling from an inner end thereof outwardly, a spiral guiding passage thereby being defined in the receiving portion for guiding the at least one optical fiber from an inlet of the passage into a central holding space defined in a middle of the receiving portion; and at least one fastening flange connecting with an outer end of the wall adjacent the inlet of the guiding passage, the fastening flange being adapted to be secured to the at least one stationary object; wherein the wall of the receiving portion comprises two wings spiraling in opposite directions from a common inner end of the wings; wherein the holding device comprises two fastening flanges, and each of the wings connects with an inner end of a corresponding fastening flange.

2. An optical fiber holding device as described in claim 1, wherein the guiding passage has a width which is greater than a diameter of the at least one optical fiber.

3. An optical fiber holding device as described in claim 2, wherein the holding space has a diameter greater than the width of the guiding passage.

4. An optical fiber holding device as described in claim 1, wherein the at least one fastening flange defines at least one through hole therein, the at least one through hole being adapted for extension of at least one screw therethrough.

5. An optical fiber holding device as described in claim 1, wherein the receiving portion and the at least one fastening flange are integrally formed by bending a metal sheet.

6. An optical fiber holding device as described in claim 1, wherein the receiving portion and the at least one fastening flange are integrally formed by molding plastic material.

7. An optical fiber holding device as described in claim 1, wherein each fastening flange defines a through hole therein adapted for extension of a screw therethrough.

8. An optical fiber holding device as described in claim 1, wherein the holding device is flexible relative to a central longitudinal axis of the receiving portion.

9. An optical fiber holder comprising:

a receiving portion defining a central holding space with a wall spiraling axially and radially from said central holding space with a continuous spiral guiding passage between every adjacent two turns thereof, said guiding passage dimensioned to comply with an outer dimension of a fiber; wherein said wall is split into two parts extending away from each other axially, and the central holding space is substantially positioned between and far away from outermost portions of said two parts axially.

10. The holder as described in claim 9, wherein said two parts extend in a curved configuration in a plane view.

11. The holder as described in claim 9, wherein two fastening flanges extends from two opposite ends of said wall of the receiving portion, respectively.

* * * * *